United States Patent
Hakala et al.

[11] Patent Number: 5,847,533
[45] Date of Patent: Dec. 8, 1998

[54] PROCEDURE AND APPARATUS FOR BRAKING A SYNCHRONOUS MOTOR

[75] Inventors: Harri Hakala, Hyvinkää; Esko Aulanko, Kerava; Jorma Mustalahti, Hyvinkää, all of Finland

[73] Assignee: Kone Oy, Helsinki, Finland

[21] Appl. No.: 535,515

[22] Filed: Sep. 28, 1995

[30] Foreign Application Priority Data

Sep. 30, 1994 [FI] Finland ................................. 944585

[51] Int. Cl.[6] ................................................. H02P 3/22
[52] U.S. Cl. ........................ 318/798; 318/803; 318/811; 318/808; 318/375; 187/119
[58] Field of Search ........................ 318/138, 254, 318/245, 699–836

[56] References Cited

U.S. PATENT DOCUMENTS

| | | | |
|---|---|---|---|
| 3,794,898 | 2/1974 | Gross | 318/258 |
| 4,039,914 | 8/1977 | Steigerwald et al. | 318/375 |
| 4,093,900 | 6/1978 | Plunkett | 318/370 |
| 4,133,413 | 1/1979 | Watanabe | 187/29 R |
| 4,307,793 | 12/1981 | Caputo | 187/29 R |
| 4,319,177 | 3/1982 | Kawada et al. | 318/798 |
| 4,426,610 | 1/1984 | Kawada et al. | 318/798 |
| 4,434,393 | 2/1984 | Kobari et al. | 318/757 |
| 4,500,825 | 2/1985 | Schemmann et al. | 318/792 |
| 4,667,776 | 5/1987 | Nomura . | |
| 4,737,900 | 4/1988 | Kahkipuro et al. | 363/35 |
| 4,761,600 | 8/1988 | D'Atre et al. | 318/759 |
| 4,788,485 | 11/1988 | Kawagishi et al. | 318/811 |
| 4,804,067 | 2/1989 | Kahkipuro | 187/119 |
| 4,902,954 | 2/1990 | Oshima et al. . | |
| 4,996,470 | 2/1991 | Rowan et al. | 318/772 |
| 5,038,244 | 8/1991 | Tuusa | 361/56 |
| 5,070,290 | 12/1991 | Iwasa et al. | 318/758 |
| 5,099,184 | 3/1992 | Hornung et al. | 318/375 |
| 5,127,085 | 6/1992 | Becker et al. | 388/903 |
| 5,168,416 | 12/1992 | Bailey et al. | 361/31 |
| 5,187,419 | 2/1993 | DeLange | 318/805 |
| 5,245,495 | 9/1993 | Bailey et al. | 361/23 |
| 5,291,106 | 3/1994 | Murty et al. . | |
| 5,323,095 | 6/1994 | Kumar | 318/376 |
| 5,350,988 | 9/1994 | Le | 318/618 |

FOREIGN PATENT DOCUMENTS

| | | |
|---|---|---|
| 3035185 | 3/1982 | Germany . |
| 60-077689 | 5/1985 | Japan . |
| 1-120797 | 8/1989 | Japan . |
| 356857 | 1/1970 | Sweden . |

OTHER PUBLICATIONS

Abstract of JP-A-61 288784 (Hitachi Ltd) Dec. 18, 1986, *Patent Abstracts of Japan*, vol. 11, No. 152, (E-507), May 16, 1987.

Abstract of SU-A-754 633 (Sibe Power Res Inst), Aug. 7, 1980, *Soviet Inventions Illustrated*, Section EI, Week 2081 Jun. 24, 1981, Derwent Publications Ltd., London, GB; Class X13, AN E5609 "Synchronous generator electrid brake controller -has non-linear resistor and current transformer feeding relay and switch controller".

*Primary Examiner*—Paul Ip

[57] ABSTRACT

The invention relates to a method and an apparatus for braking a synchronous motor (2) magnetized with permanent magnets. According to the invention, there is connected to the input connectors (38,40,42) of the synchronous motor a non-linear braking resistor (60) by means of which the stator windings of the synchronous motor (2) are closed.

34 Claims, 2 Drawing Sheets

5,847,533

PROCEDURE AND APPARATUS FOR BRAKING A SYNCHRONOUS MOTOR

The present invention relates to a method and to an apparatus for the braking of a synchronous motor.

BACKGROUND OF THE INVENTION

Safe operation of an elevator in the case of a malfunction, such as a power failure, is ensured by using a mechanical brake, which is often additionally backed up by employing electric, so-called dynamic braking. In dynamic braking, mechanical energy of the elevator is transmitted via the motor to a load external to the motor. This prevents acceleration of the elevator even if the mechanical brake should be inoperative.

When an asynchronous motor is used, dynamic braking is only possible if a d.c. current is supplied into the primary winding. This generally requires special arrangements and the use of accessories such as separate rectifying equipment designed for the purpose. In the case of a d.c. motor, the braking can be implemented by connecting a resistor to the rotor circuit. In this case it is required that the magnetization of the motor be in working order.

In the case of a synchronous motor, dynamic braking can be implemented in a manner corresponding to the d.c. motor. The braking power and the current flowing through the braking resistor become large if the stator windings are shorted when the motor runs at full speed. On the other hand, at a low speed it is necessary to make sure that a sufficient torque is generated to achieve a low sink speed.

SUMMARY OF THE INVENTION

The object of the invention is to develop a new and advantageous dynamic braking system for a synchronous elevator motor.

The solution offered by the present invention allows the dynamic braking of a synchronous motor to be achieved at a very low cost. To implement the solution in practice, only one contact pair is required, which is needed in any case to discharge the intermediate circuit capacitor of the frequency converter.

A non-linear resistance ensures that the sink speed (i.e., the speed at which the elevator car descends, or sinks, during a malfunction such as a power failure) is as low as possible. The same safety level is achieved for an elevator driven by a synchronous motor as for one with a worm gear, which means that the elevator will not descend fast even if the brake should fail. This is specifically achieved by an embodiment of the invention in which the winding is shorted at zero speed, or nearly short-circuited by changing the value of the braking resistance to a very low value.

The solution of the invention can be used in connection with various power supply devices controlling the motor, by mounting the dynamic braking resistors either in the d.c. intermediate circuit or on the motor terminals.

BRIEF DESCRIPTION OF THE DRAWINGS

In the following, the invention is described in detail by the aid of one of its embodiments by referring to the drawings, in which.

DETAILED DESCRIPTION OF THE PREFERRED EMBODIMENTS

Figure 1:
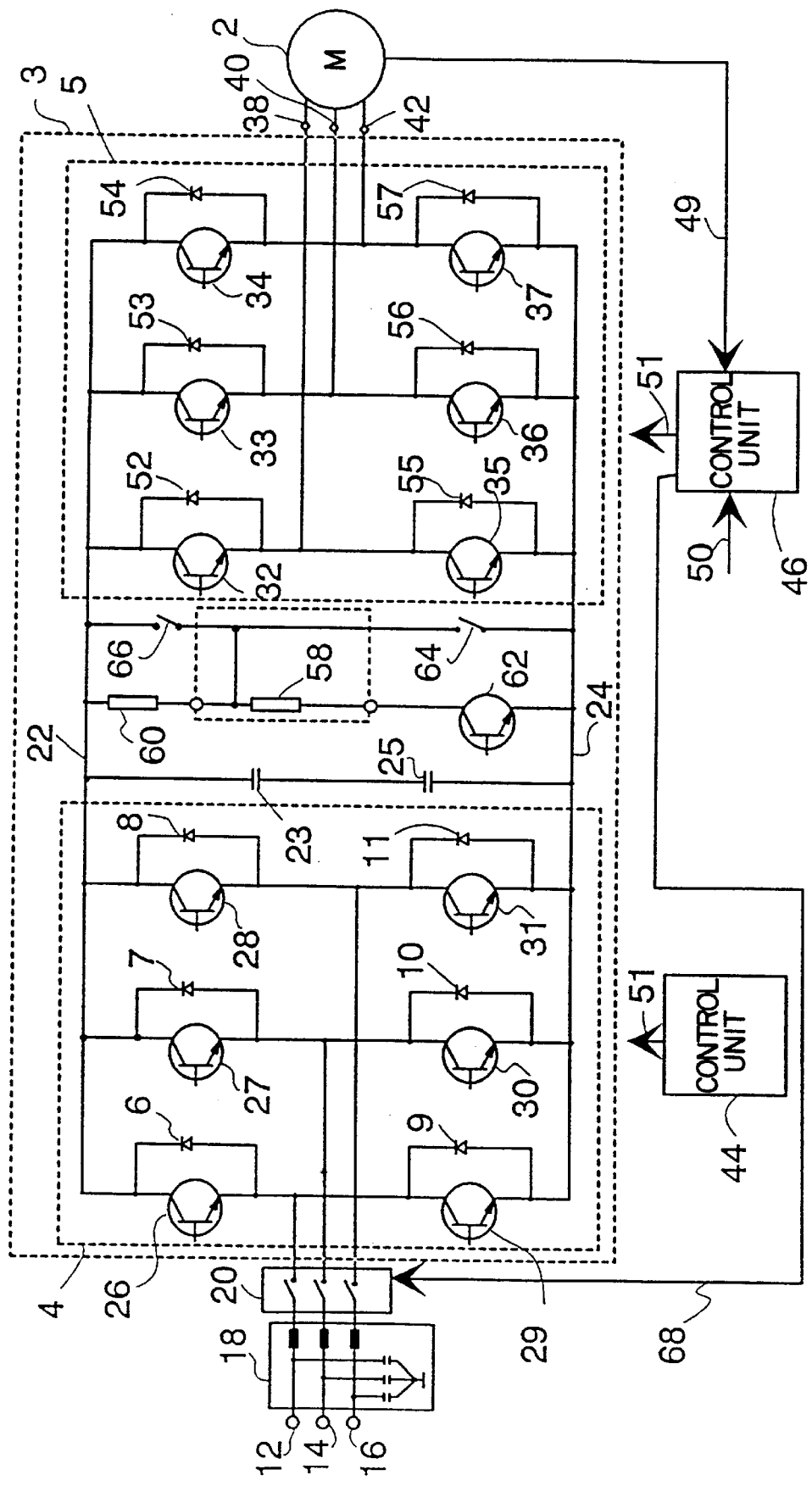
FIG. 1 illustrates a frequency converter circuit according to one embodiment of the present invention.

FIG. 1 illustrates the basic circuit arrangement of a frequency converter 3 with an intermediate circuit, used for the control of a synchronous motor 2. The frequency converter 3 comprises a mains bridge 4, which rectifies a three-phase mains supply voltage applied to the input conductors 12, 14 and 16. Connected between the supply mains and the mains bridge is a mains filter 18 consisting of coils and capacitors, and a three-phase mains switch 20. The mains bridge feeds the rectified voltage into the intermediate circuit conductors 22 and 24, which are interconnected by capacitors 23 and 25 connected in series. Connected in inverse-parallel with each diode 6, 7, 8, 9, 10, 11 is a respective transistor 26, 27, 28, 29, 30, 31. By appropriately controlling these transistors, it is possible to return braking power into the mains if desired.

Connected to the intermediate circuit conductors 22 and 24 is the motor bridge 5 of the frequency converter, which consists of a bridge circuit of transistors 32, 33, 34, 35, 36, 37. The output from the a.c. side of the motor bridge is connected to the motor input terminals 38, 40, and 42 to pass a current to the stator windings of motor 2. Transistors 32–37 are so controlled that the supply voltage of the synchronous motor has an amplitude and frequency as required by the operation. The mains bridge 4 is controlled by a control unit 44 and the motor bridge 5 by a control unit 46. On the basis of measured and reference quantities, such as current and voltage measurements, speed measurement 49 and speed reference 50, the control units 44,46 generate control pulses and apply them to the control inputs of the transistors via control conductors 51. When the present invention is used, the control of the transistors can be implemented using one of several techniques known in themselves. The control unit 46 also controls the mains switch 20 via control conductor 68. Connected in inverse-parallel with the transistors 32–37 are diodes 52, 53, 54, 55, 56, 57. The synchronous motor 2 is magnetized with permanent magnets, so the motor preserves its magnetization during possible power failures. The motor is mechanically linked to the traction sheave (not shown) of the elevator to enable the elevator car to be moved by means of hoisting ropes.

Figure 2:
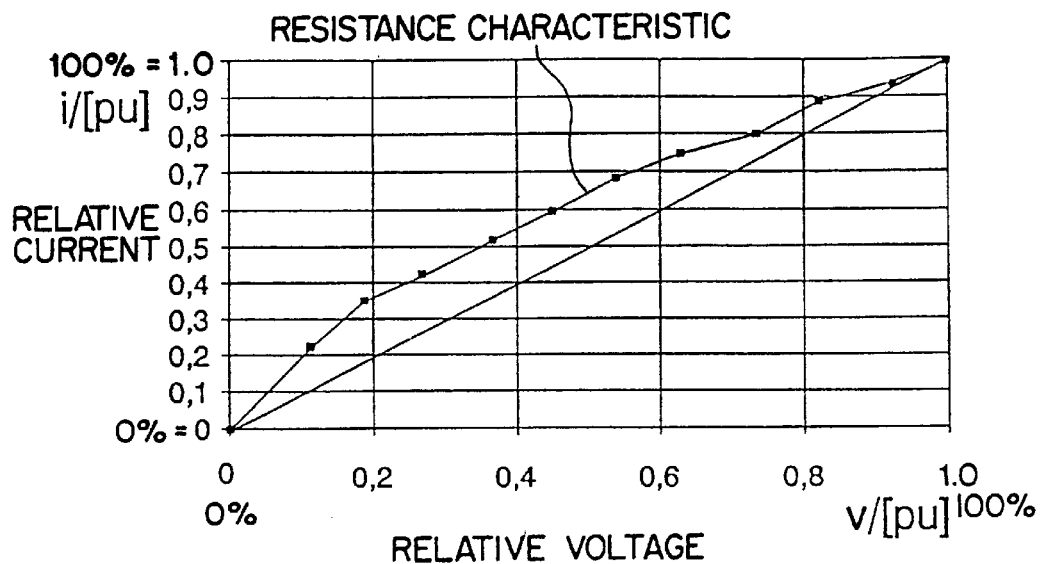
FIG. 2 presents a graph of the voltage-current characteristic of the dynamic braking resistor.

Connected between conductors 22 and 24 in the intermediate circuit of the frequency converter are braking resistors 58 and 60 in series with a braking transistor 62. During normal operation, control unit 46 controls transistor 62 in such a way that the power generated by the motor is at least partially consumed in the braking resistors. Braking resistor 58 is a normal braking resistor used to consume the returning power. Braking resistor 60 has a non-linear voltage-current characteristic as shown in FIG. 2. Its resistance is larger for high voltage values than for low voltages, corresponding to the use of a metallic resistor subject to heating as e.g. in the incandescent bulb. In other words, a resistor is used in which a rise in temperature increases its resistance in the operating range. The braking resistor may also be a positive temperature coefficient (PTC) resistor or a voltage dependent (VDR) resistor.

Connected in parallel with braking resistor 58 and transistor 62 is a contactor or switch 64 which can be used to connect only braking resistor 60 between the intermediate circuit conductors 22 and 24. Moreover, connected in parallel with the non-linear braking resistor 60 is a contactor or switch 66 by means of which the resistor 60 can be shorted. Contactors 64 and 66 are connected in series, allowing them to be used to short the intermediate circuit conductors 22 and 24.

According to the invention, dynamic braking is activated when the system detects an anomalous operating condition, such as a break in the power supply, or an overspeed condition in which an overspeed governor is triggered. At the same time, contactor 64 is closed, with the consequence that the stator circuit of the motor is closed via supply conductors 38, 40 and 42, diodes 52–57 and the non-linear resistor 60. The contactor is controlled by the electromotive force generated in the motor windings. The frequency converter 3 is preferably disconnected from the mains by means of the mains switch 20. If the motor is running at a high speed at the instant the contactor 64 is closed, e.g. when the overspeed governor is triggered, then the voltage across the resistance is high and, correspondingly, the resistance 60 is also high, so that the current and therefore the braking torque is limited to the maximum value thus determined. If it is assumed e.g. in the case of FIG. 2 that the relative value V/[pu] (pu=per unit) of the voltage corresponds to full speed at its value 1.0, and the relative value i/[pu] of the current corresponds to acceleration at its value 1.0, then it can be assumed that the balanced torque for full load is about ⅓. In the case of a linear resistor, the speed would be about 33%, whereas in the case of a non-linear resistor the speed is about 17%.

The resistor used in the above example is the type of assistance element found in an incandescent lamp, as described previously. In this case, a current peak may occur at the instant the connection is made. This can be obviated by initially connecting a linear resistor in series with the non-linear resistor 60. In the example of FIG. 1, this is implemented using a normal braking resistor 58 and a transistor 62 to connect it. During normal operation, resistors 58 and 60 and the braking transistor 62 are used to control braking.

Braking resistor 60 can be replaced with a number of resistors in series that are shorted by respective contactors as the speed changes. In this case the non-linearity in the resistance value is determined on the basis of the control of the contactors.

The contactor 66 connected in parallel with resistor 60 is used to short the resistor 60 when the motor speed is zero. In this way a higher braking torque is achieved in case the brake fails. In this event the contactor can be fed with the voltage across resistor 60 or with a voltage obtained directly from the motor winding, in which case the fall in the motor speed automatically drops out the contactor 66.

In the embodiment of the invention depicted in FIG. 1, it should be noted that there is no contactor between the braking resistor and the motor windings, but the braking resistor is connected directly via the diode bridge to the stator windings of the motor, which means that operation is ensured even during a power failure, provided that the magnetization of the motor is in operation, which is best achieved by using a synchronous motor magnetized with permanent magnets.

Figure 3:
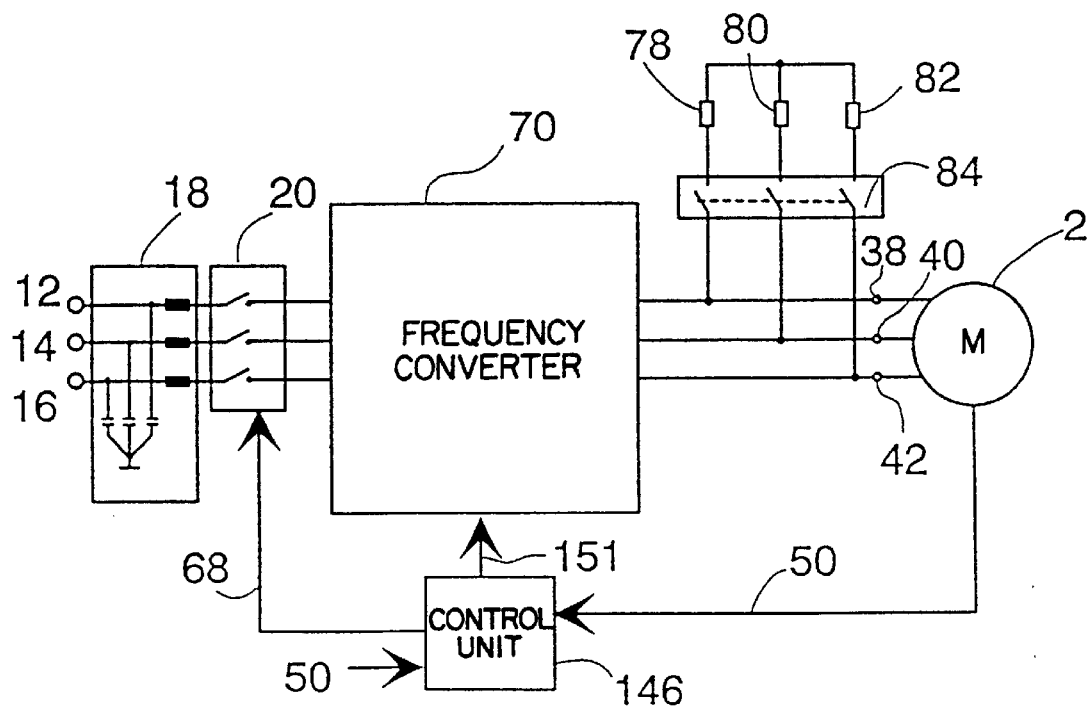
FIG. 3 illustrates a braking circuit according to another embodiment of the present invention.

FIG. 3 illustrates another embodiment of the invention, in which the synchronous motor 2 is fed by a frequency converter 70 which may be like the one in FIG. 1 or a different type. As in FIG. 1, the converter 70 is connected to the supply mains and to the motor 2. The frequency converter 70 is controlled by a control unit 146 generating control pulses that are passed via conductors 151 to the switches in the frequency converter 70. By means of a contactor 84, star-connected non-linear resistors 78, 80 and 82 are connected to the output terminals of the frequency converter. Contactor 84 is controlled by the control unit 146 in a manner corresponding to the control of contactor 64 in FIG. 1. In this embodiment, dynamic braking thus occurs completely outside the frequency converter.

The invention has been described above by the aid of some of its embodiments. However, the description of the invention is not to be regarded as a limitation on the sphere of patent protection. It should be understood that its embodiments can be varied within the limits defined by the following claims.

We claim:

1. A method for braking a synchronous motor having input connectors for the supply of a voltage into its stator windings, comprising the steps of:

(a) determining whether braking is needed; and (b) if braking is needed, then connecting at least one braking resistor having a non-linear resistance characteristic to the input connectors of the synchronous motor, thereby closing the stator windings of the synchronous motor through the at least one braking resistor, wherein the non-linear resistance characteristic is such that a resistance value of said braking resistor increases as the voltage across the braking resistor increases.

2. The method as defined in claim 1, wherein the synchronous motor is fed by a frequency converter having an intermediate circuit, and further wherein said step (b) connects the braking resistor to the intermediate circuit of the frequency converter.

3. The method as defined in claim 1, further comprising the step of (c) shortcircuiting the stator windings when the speed of the motor is substantially zero.

4. The method as defined in claim 3, wherein the motor is magnetized with permanent magnets, and further wherein said step (b) connects the braking resistor by closing a switch controlled by the electromotive force of the motor.

5. The method as defined in claim 3, wherein the short-circuiting of said step (c) causes the braking resistor to no longer be connected to the input connectors of the synchronous motor.

6. The method as defined in claim 1, wherein said step (b) connects the at least one braking resistor by closing at least one switch.

7. The method as defined in claim 1, wherein the non-linear resistance characteristic is such that a resistance value of the braking resistor increases with increased temperature.

8. The method as defined in claim 1, wherein the motor is an elevator motor, and said step (b) slows an elevator car controlled by the elevator motor.

9. An apparatus for braking a synchronous motor provided with input connectors for the supply of a voltage into the motor's stator windings, said apparatus comprising:

at least one braking resistor having a non-linear resistance characteristic, said at least one braking resistor being selectively connected to the input connectors of the synchronous motor; and at least one switch for selectively connecting said at least one braking resistor to the input connectors such that the stator windings of the synchronous motor can be closed, wherein the non-linear resistance characteristic is such that a resistance value of said braking resistor increases as the voltage across said braking resistor increases.

10. The apparatus as defined in claim 9, further comprising a frequency converter provided with an intermediate circuit having d.c. conductors, said at least one braking resistor and said switch being mounted between the d.c. conductors of said intermediate circuit.

11. The apparatus as defined in claim 10, further comprising a second switch connected in parallel with said at least one braking resistor for selectively short-circuiting the stator windings of the motor.

12. The apparatus as defined in claim 10, wherein the non-linear resistance characteristic is such that a resistance value of said braking resistor increases with increased temperature.

13. The apparatus as defined in claim 9, wherein the synchronous motor is magnetized with permanent magnets, and said switch is controlled by the electromotive force of the motor.

14. The apparatus as defined in claim 9, wherein said motor is an elevator motor and said switch selectively connects said braking resistor in order to slow an elevator car controlled by the elevator motor.

15. The apparatus as defined in claim 9, wherein the non-linear resistance characteristic is such that a resistance value of said braking resistor increases with increased temperature.

16. The apparatus as defined in claim 9, further comprising:
  a second braking resistor connected in series with said braking resistor and in parallel with said switch; and
  a second switch for selectively connecting said second braking resistor to the input connectors of the motor.

17. The apparatus as defined in claim 16, wherein said second switch is a transistor.

18. A method for braking a synchronous motor having input connectors for the supply of a voltage into its stator windings, comprising the steps of:
  (a) determining whether braking is needed; and
  (b) if braking is needed, then connecting at least one braking resistor having a non-linear resistance characteristic to the input connectors of the synchronous motor, thereby closing the stator windings of the synchronous motor through the at least one braking resistor,
  wherein said step (b) connects the at least one braking resistor by closing at least one switch, and
  wherein there are a plurality of the braking resistors equal in number to the number of input connectors of the motor, the plurality of braking resistors being arranged in a star configuration, and further wherein said step (b) connects a respective one of the three braking resistors to a respective pair of the input connectors.

19. The method as defined in claim 18, wherein there are exactly three of the braking resistors and exactly three of the switches, and said step (b) controls the three switches such that they open and close together.

20. An apparatus for braking a synchronous motor provided with input connectors for the supply of a voltage into the motor's stator windings, said apparatus comprising:
  at least one braking resistor having a non-linear resistance characteristic, said at least one braking resistor being selectively connected to the input connectors of the synchronous motor; and
  at least one switch for selectively connecting said at least one braking resistor to the input connectors such that the stator windings of the synchronous motor can be closed,
  wherein there are a plurality of said braking resistors equal in number to the number of input connectors of the motor, said plurality of braking resistors being arranged in a star configuration such that a respective one of said braking resistors is selectively connected between a respective pair of the input connectors.

21. The apparatus as defined in claim 20, wherein there are exactly three of said braking resistors and exactly three of said switches.

22. The apparatus as defined in claim 21, wherein said three switches are controlled such that they open and close together.

23. A method for braking a motor having stator windings, the method comprising the steps of:
  (a) supplying power to the motor in order to drive the motor;
  (b) determining when braking of the motor is needed;
  (c) connecting, when said step (b) determines that braking is needed, at least one braking resistor across the stator windings, the braking resistor having a resistance characteristic such that a rise in voltage across the braking resistor increases the resistance of the braking resistor.

24. The method as defined in claim 23, wherein said step (b) determines that braking is needed in response to a break in the power supplied to the motor in step (a).

25. The method as defined in claim 23, wherein the motor is an elevator motor mechanically linked to an elevator car, and said step (b) includes detecting an overspeed condition of the elevator car and determining that braking is needed when the overspeed condition of the elevator car is detected.

26. The method as defined in claim 23, wherein the resistance characteristic is a non-linear voltage-current characteristic.

27. The method as defined in claim 23, wherein the resistance characteristic is non-linear and is such that a rise in temperature increases the resistance of the braking resistance.

28. The method as defined in claim 23, wherein a plurality of the braking resistors are connected in series, and said step (c) selectively connects or short-circuits the braking resistors individually as the speed of the elevator car changes.

29. The method as defined in claim 23, wherein the motor is a synchronous motor.

30. The method as defined in claim 29, wherein the synchronous motor is mechanically liked to an elevator car such that said step (a) moves the elevator car up/down.

31. A method for minimizing sink speed of an elevator car driven by a synchronous motor, said method comprising:
  (a) connecting a first braking resistance across stators of the synchronous motor when the elevator car is being braked from a first speed; and
  (b) connecting a second braking resistance across the stators when the elevator car is being braked from a second speed, the second speed being slower than the first speed,
  wherein the second braking resistance is lower than the first braking resistance.

32. The method as defined in claim 31, wherein the same resistor is used for the first and second braking resistances, and a voltage across the resistor is higher at the first speed than the voltages across the resistor at the second speed.

33. The method as defined in claim 31, wherein said step (b) is performed when the elevator car is released from a stopped state and no power is being supplied to the synchronous motor.

34. A method for braking an elevator car mechanically linked to an elevator motor having stator windings, the method comprising the steps of:

(a) moving the elevator car by supplying power to the motor;

(b) determining when braking of the moving elevator car is needed;

(c) connecting, when said step (b) determines that braking is needed, a braking resistance across the stator windings, the braking resistance having a non-linear resistance characteristic, wherein the braking resistance includes a plurality of series-connected resistors, and the non-linear characteristic is accomplished by selectively connecting or short-circuiting the individual resistors as the speed of the elevator car changes.

* * * * *